Patented Mar. 15, 1966

3,240,742
RAPIDLY CRYSTALLIZABLE POLYMERIC BLEND OF VINYLIDENE CHLORIDE COPOLYMERS
Harold G. Hahn, Midland, and Norman A. Lefevre, Bay City, Mich., assignors to The Dow Chemical Company, Midland, Mich., a corporation of Delaware
No Drawing. Filed Oct. 3, 1962, Ser. No. 228,785
4 Claims. (Cl. 260—30.4)

The present invention relates to crystalline vinylidene chloride polymer compositions, and more particularly, to vinylidene chloride polymer compositions which can be cast to form rapidly crystallizable films and coatings.

Copolymers and interpolymers of vinylidene chloride with such comonomers as acrylonitrile, vinyl chloride, and lower alkyl acrylates have found wide acceptance as coating materials because of their desirable properties; inluding the ability to be heat-sealed, transparency, inertness, and low water vapor transmission rates. Specifically, polymers of at least about 70 percent by weight of vinylidene chloride with the remainder of at least one monoethylenically unsaturated comonomer, as defined herein, have been found to provide satisfactory coating materials for such substrates as regenerated cellulose films, paper, and thermoplastic films such as polyolefins and the like. The polymeric materials are applied to the substrate by well-known coating procedures, generally either in organic solvent solutions or in the form of aqueous latices. The resultant coatings, after removal of solvent or water, are in an amorphous state and must be permitted to crystallize before the coated substrate is wound up, as the coating, when in the amorphous state, causes serious blocking. The time required for the coating to crystallize is generally very long, in the order of 1 to 15 hours at temperatures of about 60° C. Accordingly, the production of coated substances utilizing such prior art polymeric compositions are not adapted to advantageous high speed operations.

It is known to accelerate the crystallization of such copolymers by the addition of certain plasticizers. Many plasticizers, however, increase the moisture vapor transmission rate and also present problems of extraction in food products contacting the coating.

It is accordingly an object of this invention to provide improved polymeric compositions comprising normally crystalline copolymers and interpolymers of vinylidene chloride which have relatively short crystallization induction periods.

It is a further object of the invention to provide improved polymeric coating compositions which possess low water vapor transmission rates and which may be applied to substrates by economical high speed production methods.

It is among the further objects of the invention to provide a means of preparing improved coated substrates, such as regenerated cellulose film, paper, thermoplastic films, and the like, wherein said coating is a normally crystalline vinylidene chloride interpolymer which has a noticeably reduced crystallization induction period.

The above and related objects are achieved by a blend of (I) a normally crystalline, film-forming vinylidene chloride interpolymer consisting of (a) from 70 to 97 weight percent of vinylidene chloride and (b) from 3 to 30 percent by weight of at least one monoethylenically unsaturated comonomer, said interpolymer uniformly dispersed in a continuous phase, and (II) from about 0.003 to 6 percent, based on the weight of such vinylidene chloride interpolymer of a polymeric crystallite nucleating agent consisting of a vinylidene chloride polymer having a crystallization induction period less than that of said vinylidene chloride interpolymer. The compositions of the present invention have a decidedly reduced crystallization induction period when cast as unsupported films or as coatings for substrates such as regenerated cellulose, paper, or the like, and are particularly useful for high speed production methods. Additionally, coatings and films produced from the compositions of the present invention retain the desirable properties of transparency, resistance to water vapor transmission, ability to be heat-sealed, and the like, which are characteristic of the prior known normally crystalline vinylidene chloride polymer coatings and films.

The normally crystalline vinylidene chloride polymers useful for this invention are well known and may be prepared by interpolymerizing vinylidene chloride with known comonomers. Typical of the normally crystalline polymeric materials falling within the advantageous definition are the copolymers and interpolymers consisting of from 70 to 97 percent by weight of vinylidene chloride with the remainder composed of one or more other monoethylenically unsaturated comonomers, exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, and allyl esters and ethers. Known ternary compositions also may be employed advantageously. Representative of such polymers are those consisting of from 70 to 97 percent by weight of vinylidene chloride with the remainder made up of, for example, acrolein and vinyl chloride, acrylic acid and acrylonitrile, alkyl acrylates and alkyl methacrylates, acrylonitrile and itaconic acid, acrylonitrile and vinyl acetate, vinyl propionate, or vinyl chloride, allyl esters or ethers and vinyl chloride, and vinyl ethers and vinyl chloride. Quaternary polymers of similar monomeric composition will also be known.

The film-forming vinylidene chloride interpolymers used in the invention may be prepared according to procedures well known in the art, as by suspension or emulsion polymerization, utilizing conventional polymerization conditions, catalysts, emulsifying or suspending agents, etc.

The polymeric crystallite nucleating agents of the present invention may be any vinylidene chloride polymer as described herein, having a crystallization induction period less than that of said film-forming vinylidene chloride interpolymer. It is particularly advantageous, however, that such polymeric crystallite nucleating agents consist of at least about 95 percent by weight of vinylidene chloride. As purely exemplary of materials useful as crystallite nucleating agents of the present invention are those materials consisting of polyvinylidene chloride, and copolymers consisting of at least about 95 percent by weight of vinylidene chloride with the remainder being acrylonitrile.

The polymeric crystallite nucleating agents as described herein may be prepared by comminution of conventionally prepared, dried vinylidene chloride polymers as described herein, or alternatively, by selective formation of such crystallite materials in suitable solvent solutions of vinylidene chloride polymers. In this regard, it is well known in the art that lacquers for casting unsupported films and for coating unsupported films are advantageously prepared by dissolving normally crystalline vinylidene chloride polymers such as copolymers containing from about 85 to 95 percent by weight of vinylidene chloride and correspondingly lesser amounts of a monoethylenically unsaturated comonomer such as acrylonitrile, in a solvent system comprising about 50 percent to about 80 percent by weight of tetrahydrofuran and about 50 percent to about 20 percent by weight of toluene. Such polymeric materials are known to be heterogeneous and to contain some polymers of different monomeric ratios than the starting monomers. Thus such materials frequently contain small amounts of polyvinylidene chloride plus other high vinylidene chloride polymers.

It has now been found that polymeric crystallite nucleating agents as described herein can be advantageously formed by dilution of such lacquer coating system with small amounts of a non-solvent for polyvinylidene chloride, such as propylene glycol, ethyl alcohol, water, nitromethane, naphtha, carbon tetrachloride, among many others.

It has further been found that suitable polymeric crystallite nucleating materials as described herein, are selectively formed by dissolving normally crystalline vinylidene chloride polymers as described herein, in a solvent system such as a mixture comprising about 65 percent methyl ethyl ketone and correspondingly about 35 percent toluene.

Lacquer base casting compositions may be prepared by dissolving the desired amounts of the dried film-forming vinylidene chloride polymer and the polymeric crystallite nucleating agent in a common solvent therefore, or alternatively, by selective precipitation of such polymeric crystallite nucleating agents from an organic solvent solution of such film-forming vinylidene chloride interpolymer using the procedures as described herein. Still another means for preparing such lacquer base coating composition consists of selective formation of such polymeric crystallite nucleating agents in an organic solvent solution as described herein, followed by addition of small amounts of such solution to the organic solvent solution of the film-forming vinylidene chloride interpolymer. Such lacquer base coating compositions generally contain from 5 percent to about 35 percent by weight of the polymeric composition in solution.

Latex casting compositions are conveniently prepared by simply mixing the desired amounts of the polymeric crystallite nucleating agent in solid pulverant form or preferably in aqueous latex to an aqueous latex of the film-forming vinylidene chloride interpolymer. Suitable latex base coating compositions generally contain from about 20 percent to 70 percent solids by weight.

The polymeric materials of the present invention may also be admixed while in molten form, however, this is usually less desirable because of the thermal degradation of the polymers when maintained at melting temperatures.

After coating the substrate by conventional techniques, the polymeric coating is crystallized at a temperature in the range of 50° to 100° C. It has been found that the crystallization times of the compositions of this invention are of the order of 50 percent or less of the time required for crystallization of the prior art polymeric materials of similar composition.

The polymeric compositions of the present invention may thus be coated onto a wide range of substrates, including films of polyethylene, polyethylene terephthalate, polytetrafluoroethylene, paper, regenerated cellulose and the like. Additionally, unsupported film of the polymeric composition may be prepared. In the case of regenerated cellulose film, the coating may be applied directly, or an anchor coat of melamine-formaldehyde, urea-formaldehyde or other aminoplast resin may be first applied to the film according to procedures well known in the art. The coatings or films may be cast from either solvent solutions or from aqueous latices as described herein.

The coating compositions of the invention may suitably contain conventional dyes, pigments, light and heat stabilizers, etc., as necessary or desired for particular applications without affecting the desirable properties of the material.

The following examples, wherein all parts and percentages are to be taken by weight, illustrate the present invention but are not to be construed as limiting its scope.

EXAMPLE 1

A latex containing about 50 percent solids of a film-forming crystalline terpolymer composed of 75 percent by weight of vinylidene chloride, 20 percent by weight of vinyl chloride and 5 percent by weight of ethyl acrylate was prepared by emulsion polymerization, utilizing potassium persulfate as the catalyst and the dihexyl ester of the sodium salt of sulfosuccinic acid is the emulsifier in a manner well known in the art.

To one such latex composition was dispersed a similarly prepared latex of a polymeric crystallite nucleating agent consisting of polyvinylidene chloride in amounts sufficient to provide 0.5 percent of such crystallite nucleating agent based on the weight of the vinylidene chloride terpolymer constituent.

To another similar unmodified latex composition of film-forming vinylidene chloride terpolymer was similarly added 0.5 weight percent of a polymeric crystallite nucleating agent consisting of 97 percent by weight vinylidene chloride and 3 percent by weight acrylonitrile. A latex composition which contained no polymer crystallite nucleating agent was used for comparative purposes. Each of the latex compositions was individually cast into unsupported films about 0.2 mil thick. The crystallization induction time for each film was individually determined by measuring the time to initial yield point of such films while stretching the same at 70° C.

The following Table I illustrates the polymeric crystallite nucleating agent used and the crystallization induction time of the resulting polymeric films.

*Table 1*

| Sample No. | Polymeric Crystallite Nucleating Agent | | Crystallization Induction time of Film at 70° C., Minutes |
|---|---|---|---|
| | Kind | Percent Based on the Weight of Vinylidene Chloride Terpolymer | |
| FOR COMPARISON | | | |
| 1 | None | | 60 |
| THIS INVENTION | | | |
| 2 | Polyvinylidene Chloride | 0.5 | <15 |
| 3 | 97 percent polyvinylidene chloride—3 percent acrylonitrile copolymer | 0.5 | <15 |

To another sample of the unmodified vinylidene chloride terpolymer latex was similarly added 6 percent by weight of a polymeric crystallite nucleating agent consisting of a copolymer of 97 percent by weight vinylidene chloride and 3 percent by weight of acrylonitrile. A similar sample of the vinylidene chloride latex which contained no polymeric crystallite nucleating agent was used for comparative purposes. Each latex composition was subsequently cast into an unsupported film as described herein, and each of the so-formed films aged for varying time periods at about 25° C. after which the percent crystallinity was separately determined by conventional X-ray analysis.

The following Table II illustrates the polymeric crystallite nucleating agent used and the percent crystallinity of each film after aging for the designated time period.

*Table II*

| Sample No. | Polymeric Crystallite Nucleating Agent | | Percent Crystallinity After Aging | |
|---|---|---|---|---|
| | Kind | Percent based on the Weight of Vinylidene Chloride Terpolymer | 24 Hours | 72 Hours |
| FOR COMPARISON | | | | |
| 4 | | | 25 | 79 |
| THIS INVENTION | | | | |
| 5 | 97 percent Vinylidene Chloride—3 percent Acrylonitrile Copolymer | 6 | 75 | 85 |

EXAMPLE 2

In each of a series of experiments a 20 percent solids lacquer casting solution was prepared composed of a film-forming crystalline copolymer of 90 percent by weight vinylidene chloride and 10 percent acrylonitrile dissolved in a solvent mixture composed of 35 parts toluene and 65 parts tetrahydrofuran, said tetrahydrofuran having dissolved therein prior to mixing with the above described toluene and film-forming vinylidene chloride copolymer, varying amounts of a polymeric crystallite nucleating agent consisting of a copolymer of 99 percent weight vinylidene chloride and 1 percent by weight acrylonitrile.

Each of the so-formed lacquer solutions were individually cast on ¼ mil polytetrafluoroethylene film to form a coating having a thickness of about 0.2 mil. Each coated sample was then individually dried at 115° C. for 1 minute and the crystallization induction time determined by infra-red analysis of each coated sample during aging at 65° C. A similar lacquer casting solution containing no polymeric crystallite nucleating agent was prepared and cast as described herein for comparative purposes.

The following Table III illustrates the polymeric crystallite nucleating agent used and the crystallization induction time at 65° C. for the coated test sample.

*Table III*

| Sample No. | Polymeric Crystallite Nucleating Agent | | Crystallization Induction Time of Coating at 65° C., Minutes |
|---|---|---|---|
| | Kind | Percent Based on Weight of Film-Forming Copolymer of Vinylidene Chloride and Acrylonitrile | |
| FOR COMPARISON | | | |
| 6 | None | | 40 to 60 |
| THIS INVENTION | | | |
| 7 | 99 Percent Vinylidene Chloride—1 percent Acrylonitrile Copolymer | .0031 | <20 |
| 8 | do | .0062 | <20 |
| 9 | do | .0125 | <20 |
| 10 | do | .025 | <20 |

Similar good results were observed when similar amounts of the same polymeric crystallite nucleating agent were dispersed in the so-described unmodified lacquer casting solutions and subsequently cast as coating as described herein.

EXAMPLE 3

In each of a series of experiments, to a 25 percent solids lacquer casting solution composed of a film-forming crystalline copolymer of 91 percent vinylidene chloride and 9 percent acrylonitrile dissolved in tetrahydrofuran, was added varying amounts of a suitable non-solvent capable of selectively precipitating a polymeric crystallite nucleating agent having a higher vinylidene chloride content than the average of the polymeric solids contained in the lacquer solution. Each of the so-formed lacquer solutions was individually cast on ¼ mil polytetrafluoroethylene film to form a coating about 0.2 mil thick, and each coated sample dried at 115° C. for 1 minute. The crystallization induction time of each coating was subsequently determined by infra-red analysis while aging each test sample at 65° C.

The following Table IV illustrates the non-solvent used and the crystallization induction time for each coating while aged at 65° C.

Table IV

| Sample No. | Non-Solvent | | Crystallization Induction Time for Coating at 65° C., Minutes |
|---|---|---|---|
| | Kind | Percent by Weight Based on the Weight of Polymer Solids in the Lacquer Casting Solution | |
| FOR COMPARISON | | | |
| 11 | None | | 100 |
| THIS INVENTION | | | |
| 12 | Nitromethane | 62.8 | 1 |
| 13 | Naphtha | 23 | 5 |
| 14 | Carbon Tetrachloride | 64.8 | 60 |
| 15 | Ethyl Alcohol | 20 | 80 |
| 16 | Water | 6.8 | 90 |

Similar good results were obtained wherein equivalent amounts of the designated non-solvents were added to a 20 percent solids lacquer casting solution composed of a film-forming crystalline copolymer of 80 percent by weight vinylidene chloride and 20 percent by weight of vinyl chloride dissolved in toluene, and additionally, wherein similar amounts of propylene glycol were used as the non-solvent.

EXAMPLE 4

A 20 percent solids lacquer casting solution composed of a film-forming crystalline copolymer of 91 percent by weight vinylidene chloride and 9 percent by weight acrylonitrile dissolved in a solvent mixture composed of 35 percent by weight toluene and 65 percent by weight tetrahydrofuran was cast on ¼ mil polytetrafluoroethylene film to form a coating of about 0.2 mil. The so-formed coated sample was subsequently dried at 115° C. for 1 minute and the crystallization induction time for the coating determined by infra-red analysis while aging the coated sample at 65° C.

To a similarly prepared lacquer coating solution was added 2 percent, based on the weight of so-formed lacquer coating solution, of a second lacquer coating solution composed of a 20 percent solids solution composed of the film-forming crystalline copolymer described herein dissolved at 72° C. in a solvent mixture composed of 65 percent by weight methyl ethyl ketone and 35 percent by weight toluene, said second lacquer coating solution containing a selectively precipitated polymeric crystallite nucleating agent having a higher vinylidene chloride content than the average of the polymeric solids contained in the mixed lacquer solutions. The so-formed mixed lacquer solution was cast on a ¼ mil polytetrafluoroethylene film and dried at 115° C. for 1 minute, and the crystallization induction period determined as described above.

The coating formed from the unmodified lacquer solution described herein was characterized by a crystallization induction time of 20 to 40 minutes at 65° C., whereas the crystallization induction time of the coating formed from the herein described modified lacquer solution has a crystallization induction time of less than 1 minute at 65° C.

From the data presented, it can be seen that the addition of the polymeric crystallite nucleating agents to the normally crystalline vinylidene chloride interpolymers results in coating and films having appreciably reduced crystallization induction times as compared to coatings and films produced from unmodified normally crystalline vinylidene chloride interpolymers.

Additionally, none of the coatings or films formed from the polymeric compositions of the present invention significantly adversely affect the desirable properties of transparency, inertness, ability to be heat-sealed, resistance to water vapor transmission and the like which are inherent in coatings and films produced from normally crystalline vinylidene chloride polymers.

Similar good results are obtained from a polymeric composition comprising (I) a normally crystalline film-forming vinylidene chloride interpolymer consisting of (a) from 70 to 97 percent by weight of vinylidene chloride and (b) from 3 to 30 percent by weight of at least one monoethylenically unsaturated comonomer, said interpolymer being uniformly dispersed throughout a continuous phase, and (II) from about 0.003 to 6 percent by weight based on the weight of such vinylidene chloride interpolymer of a polymeric crystallite nucleating agent consisting of a vinylidene chloride polymer having a crystallization induction period less than that of the vinylidene chloride interpolymer, said polymeric crystallite nucleating agent being produced by any process as described herein.

What is claimed is:
1. A process for preparing a composition capable of providing rapidly crystallizable self-supporting films and coatings comprising:
   (I) dissolving a copolymer of (a) from about 90 to 91 weight percent vinylidene chloride and (b) complementarily from about 10 to 9 weight percent acrylonitrile in an organic solvent therefor to form a solution containing at least about 20 weight percent of said copolymer; and
   (II) adding to said solution a miscible organic non-solvent for said copolymer in amounts sufficient to provide from between about 0.003 to about 6 weight percent, based on the weight of said copolymer, of a solid vinylidene chloride polymer having a vinylidene chloride content of at least about 95 weight percent.

2. The process of claim 1 wherein said copolymer is dissolved in tetrahydrofuran.

3. The process of claim 2 wherein said organic non-solvent for said copolymer is selected from the group consisting of nitromethane, naphtha, carbon tetrachloride and ethyl alcohol.

4. The process of claim 1 wherein said copolymer is dissolved in a solvent mixture composed of about 35 percent by weight toluene and 65 percent by weight tetrahydrofuran and said non-solvent is a mixture composed of about 65 weight percent methyl ethyl ketone and about 35 weight percent toluene.

References Cited by the Examiner
UNITED STATES PATENTS
3,108,017   10/1963   Messwarb et al. _____ 260—29.6

SAMUEL H. BLECH, *Primary Examiner.*

M. TILLMAN, *Examiner.*